United States Patent [19]

Ohsaki

[11] Patent Number: 5,046,168
[45] Date of Patent: Sep. 3, 1991

[54] APPARATUS FOR CONTROLLING THE LEADER BLOCK DRIVE IN A DEVICE

[75] Inventor: Mitsuhiro Ohsaki, Kodaira, Japan

[73] Assignee: Nakamichi Corporation, Kodaira, Japan

[21] Appl. No.: 432,533

[22] Filed: Nov. 6, 1989

[30] Foreign Application Priority Data

Nov. 10, 1988 [JP] Japan .......................... 63-146989[U]

[51] Int. Cl.⁵ .............................................. G11B 15/32
[52] U.S. Cl. ..................................... 360/95; 242/195
[58] Field of Search ................ 360/95, 93; 242/195, 242/197; 226/91-92

[56] References Cited

U.S. PATENT DOCUMENTS

| | | | |
|---|---|---|---|
| 4,426,047 | 1/1984 | Richard et al. | 242/195 X |
| 4,452,406 | 6/1984 | Richard | 360/95 X |
| 4,608,614 | 8/1986 | Rinkleib et al. | 360/95 |
| 4,704,645 | 11/1987 | Murphy et al. | 360/95 |
| 4,787,570 | 11/1988 | Nakagome | 242/195 |
| 4,793,569 | 12/1988 | Ohsaki | 242/195 |
| 4,832,284 | 5/1989 | Inoue | 360/95 X |

Primary Examiner—John H. Wolff
Attorney, Agent, or Firm—Pearne, Gordon, McCoy & Granger

[57] ABSTRACT

A magnetic recording and reproducing apparatus comprising a leader block drawing mechanism for drawing a leader block provided at a leading end of a magnetic tape from a tape cartridge having a single reel provided therein and containing the magnetic tape, the leader block drawing mechanism including a cartridge holder movable between a cartridge loading/unloading position and an operative position, a leader block drive to drive the leader block along a predetermined guide path and a control mechanism to control the leader block drive at the loading/unloading position of the cartridge holder means and allow a movement of the leader block drive at the operative position of the cartridge holder.

5 Claims, 13 Drawing Sheets

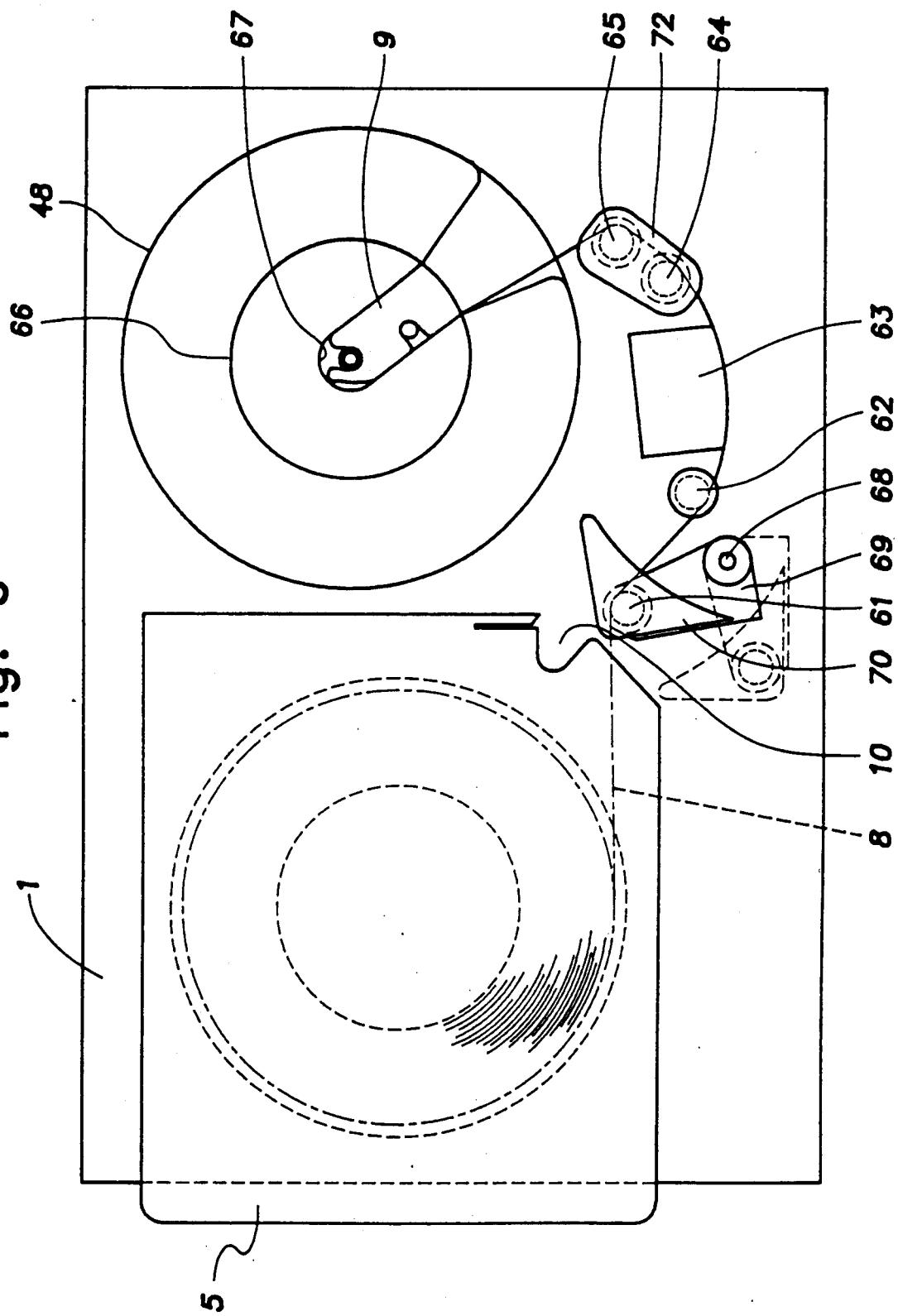

A

B

C

D

E

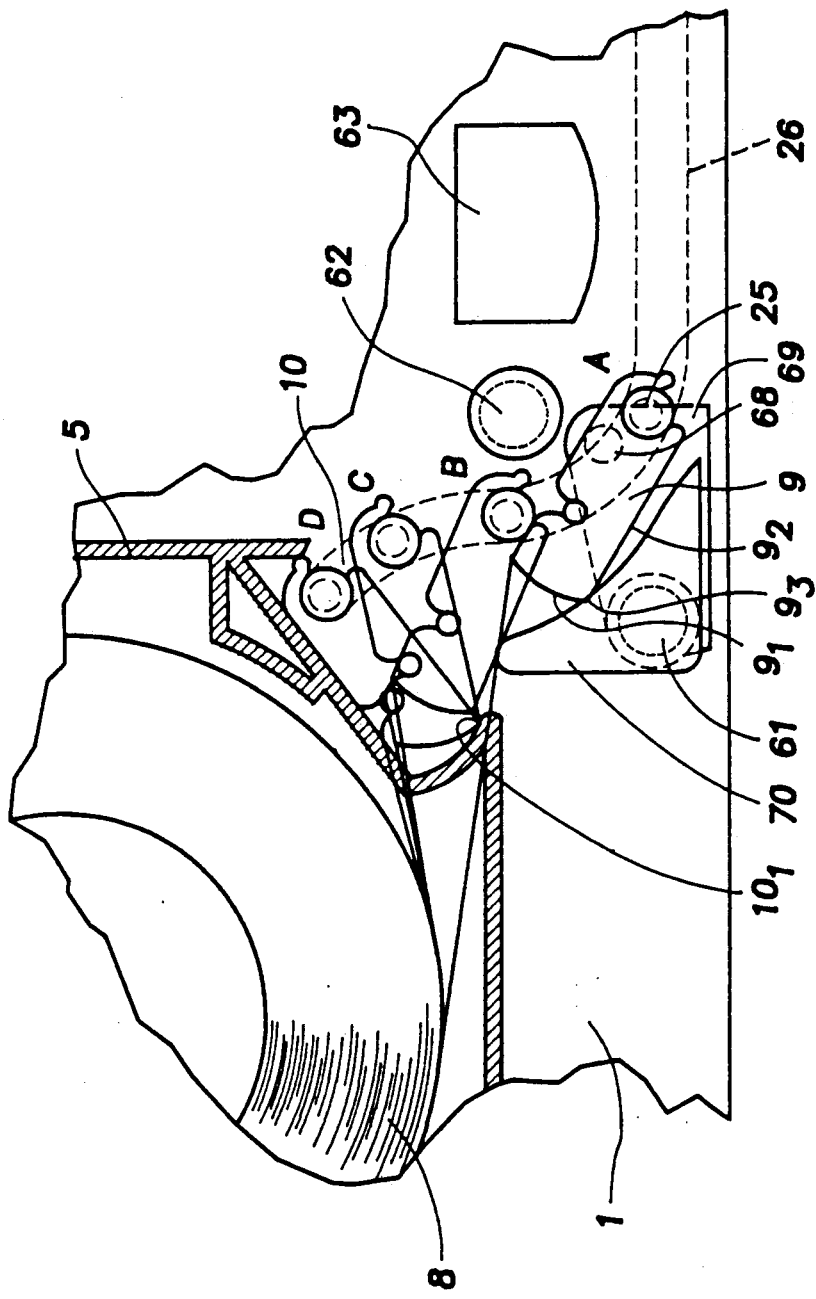

APPARATUS FOR CONTROLLING THE LEADER BLOCK DRIVE IN A DEVICE

BACKGROUND OF THE INVENTION

A tape cartridge having a leader block provided therein has been used for some magnetic recording and reproducing apparatuses which are provided as a peripheral equipment for a computer to back up information and are adapted to use a tape cartridge having a magnetic tape wound on a single reel in the tape cartridge and guided along a predetermined guide path to a winding reel in the apparatus. Such a tape cartridge has a leader block provided at a leading end of the magnetic tape while the apparatus has a drawing pin member associated with the leader block.

Such a drawing pin member is disclosed in Japanese Patent Application Publication No. 13,097/1984, for example. In this prior art, the drawing pin member is in the form of a cylinder and is formed of a relatively thinner cylindrical portion and an enlarged portion provided at the leading end of the thinner cylindrical portion. The drawing pin member is engaged with a slot in the leader block including a recess provided corresponding to the enlarged portion.

In order to bring the tape cartridge to an operative position, it is inserted into a cartridge holder at a loading/unloading position, which causes the slot in the leader block to be engaged with the cylindrical portion of the drawing pin member. Then, the tape cartridge is pushed down to the operative position, which causes the recess of the slot to be engaged with the enlarged portion of the drawing pin member so as to connect the leader block to the drawing pin member.

In such an apparatus as constructed to manually move the tape cartridge to the operative position after it is inserted into the cartridge holder at its loading/unloading position, the tape cartridge tends to be inserted into the cartridge holder while the cartridge holder is being pushed down toward the operative position. In this case, the enlarged portion of the drawing pin member engages the slot in the leader block, but the drawing pin member is never inserted into the slot because the enlarged portion has a size larger than that of the slot and therefore is pushed in a direction in which the tape cartridge is inserted.

In general, the drawing pin member is driven by an electric motor, but if no worm gears are provided in a reduction mechansim for reducing the revolution speed of the electric motor, then the drawing pin member is moved by the pushing force thereof. In this condition, the leader block can be no longer engaged with the drawing pin member. Thus, the electric source to the motor is required to be interrupted in order to return the original condition of the drawing pin member.

SUMMARY OF THE INVENTION

Accordingly, it is a principal object of the invention to provide a magnetic recording and reproducing apparatus adapted to prevent a drawing pin member from being moved although a tape cartridge is erroneously inserted into the cartridge holder. Thus, the leader block can be positively engaged with the drawing pin member.

In accordance with the present invention, there is provided a magnetic recording and reproducing apparatus comprising a leader block drawing mechanism for drawing a leader block provided at a leading end of a magnetic tape from a tape cartridge having a single reel provided therein and containing said magnetic tape, said leader block drawing mechanism characterized by;

holder means having at least a cartridge holder to hold said tape cartridge and movable between a cartridge loading/unloading position and an operative position relative to a chassis of said apparatus;

leader block drive means provided on said chassis to drive said leader block along a predetermined guide path;

and control means provided in said holder means to control the leader block drive means at said loading/unloading position of said holder means and allow movement of said leader block drive means at said operative position of said holder means.

Thus, it will be noted that the leader block drive means is controlled from being moved at the loading/unloading position of the holder means, and that the leader block drive means can be allowed to be moved at the operative position of the holder means.

BRIEF DESCRIPTION OF THE DRAWINGS

The above and other objects and features of the invention will be apparent from the description of the embodiments of the invention taken along with the accompanying drawings in which;

FIG. 6 illustrates in plan view a tape running path in the apparatus of FIG. 1;

FIG. 11 illustrates in plan view positions where the leader block is sequentially located;

DESCRIPTION OF THE PREFERRED EMBODIMENTS

Figure 1:
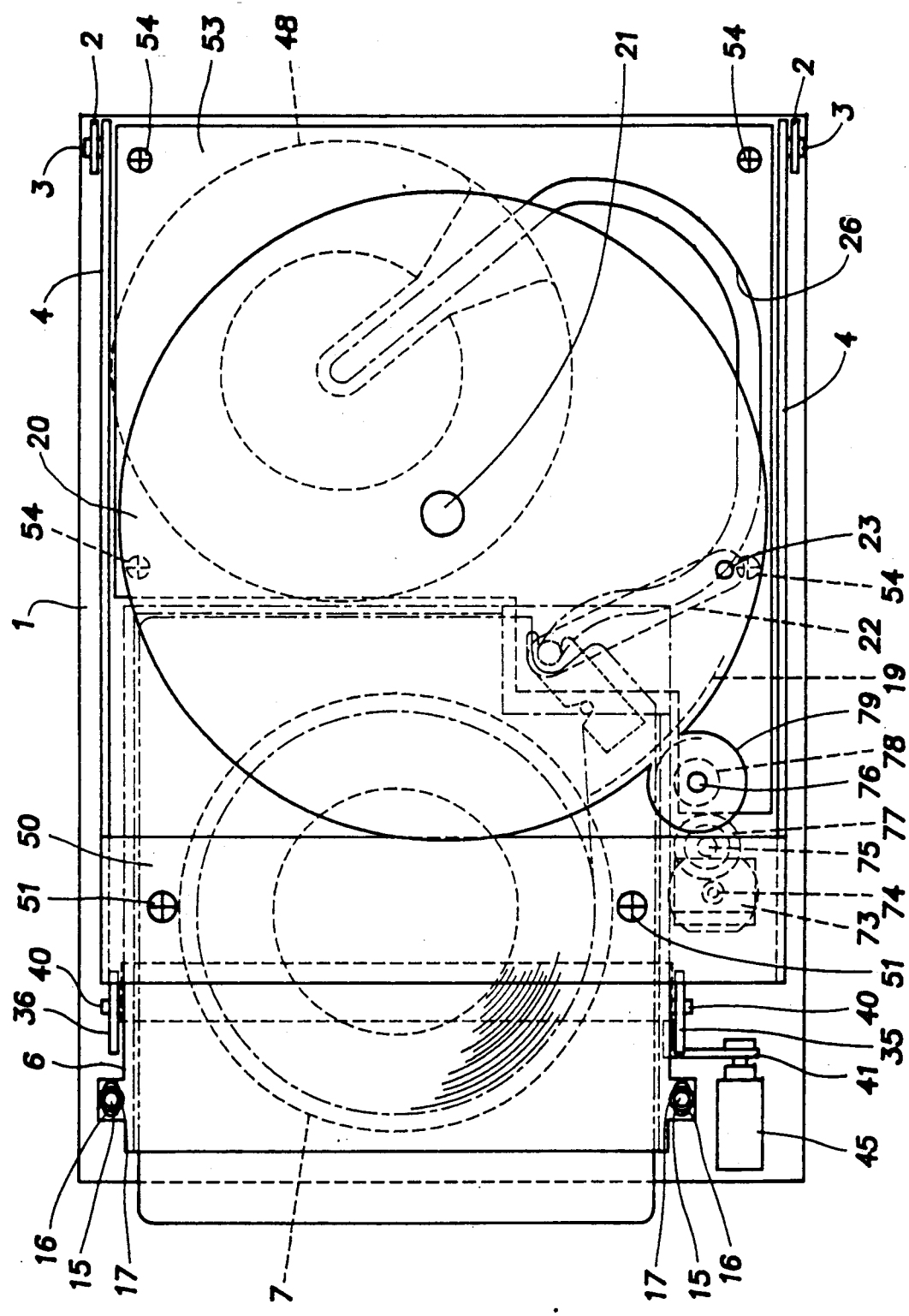
FIG. 1 is a plan view of a magnetic recording and reproducing apparatus constructed in accordance with an embodiment of the invention with a tape cartridge located at an operation position.
Figure 2:
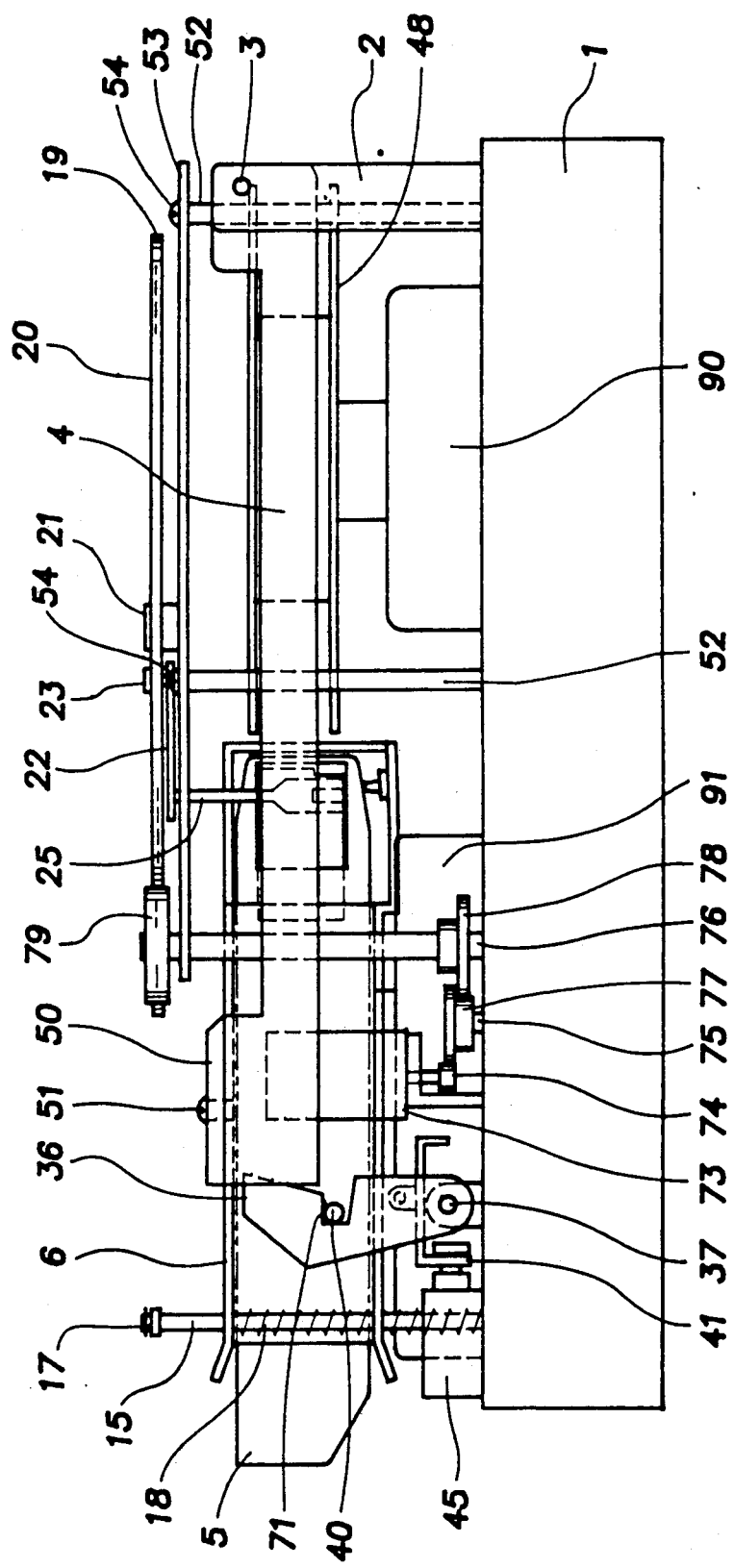
FIG. 2 is a side elevational view of the apparatus of FIG. 1.
Figure 3:
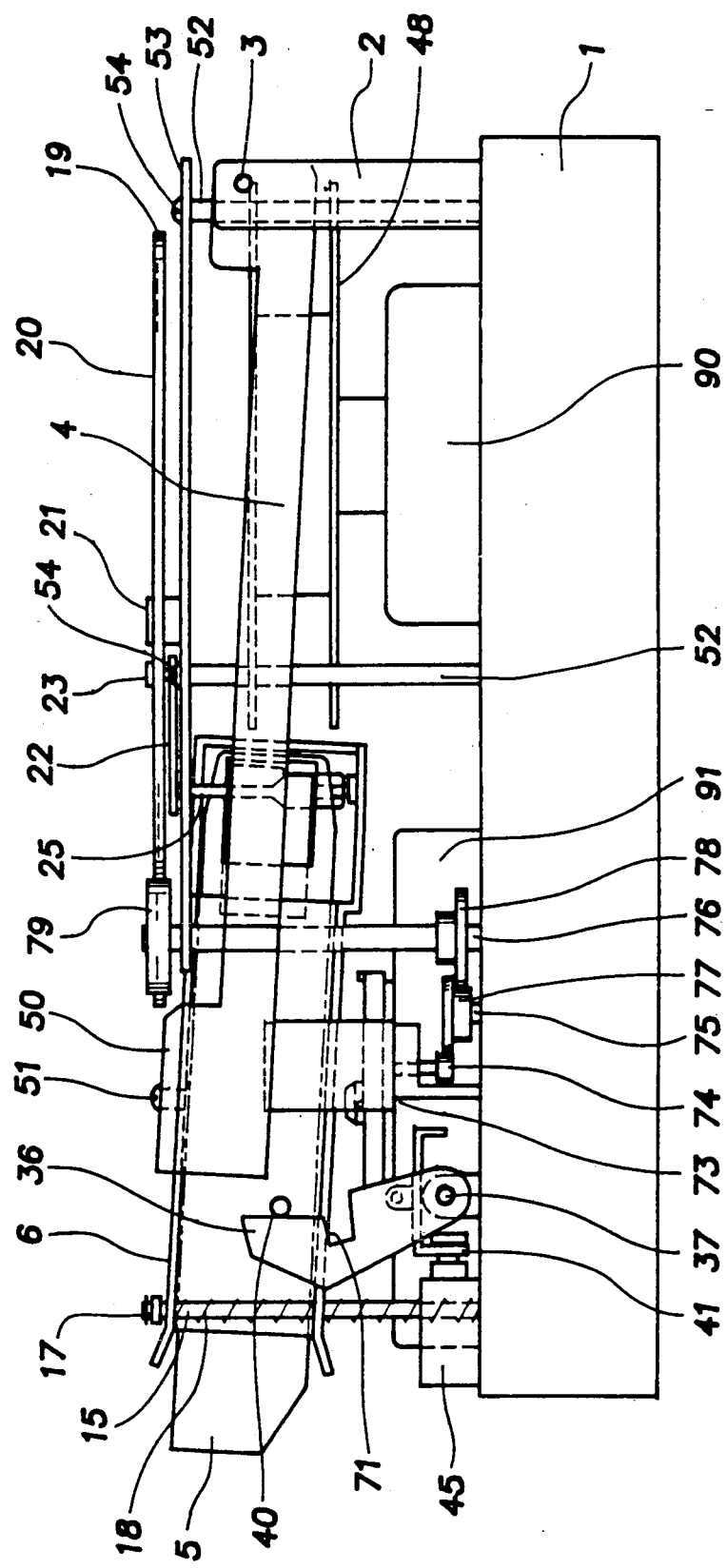
FIG. 3 is a side elevational view of the apparatus with the tape cartridge located at a position where the tape cartridge is able to be loaded into the magnetic apparatus or to be unloaded from the magnetic apparatus.

Referring now to FIGS. 1 through 3, there is shown a magnetic recording and reproducing apparatus constructed in accordance with an embodiment of the invention.

A pair of swingable arms 4 and 4 at their one end are pivotally supported by pins 3 and 3 on brackets 2 and 2 formed on a main chassis 1 at its rear side and at their other end connected to each other by a connecting plate 50 so as to be rotated together. A cartridge holder 6 for containing a tape cartridge 5 is connected by screws 51 and 51 to the connecting plate 50 on its lower face.

Figure 4A:
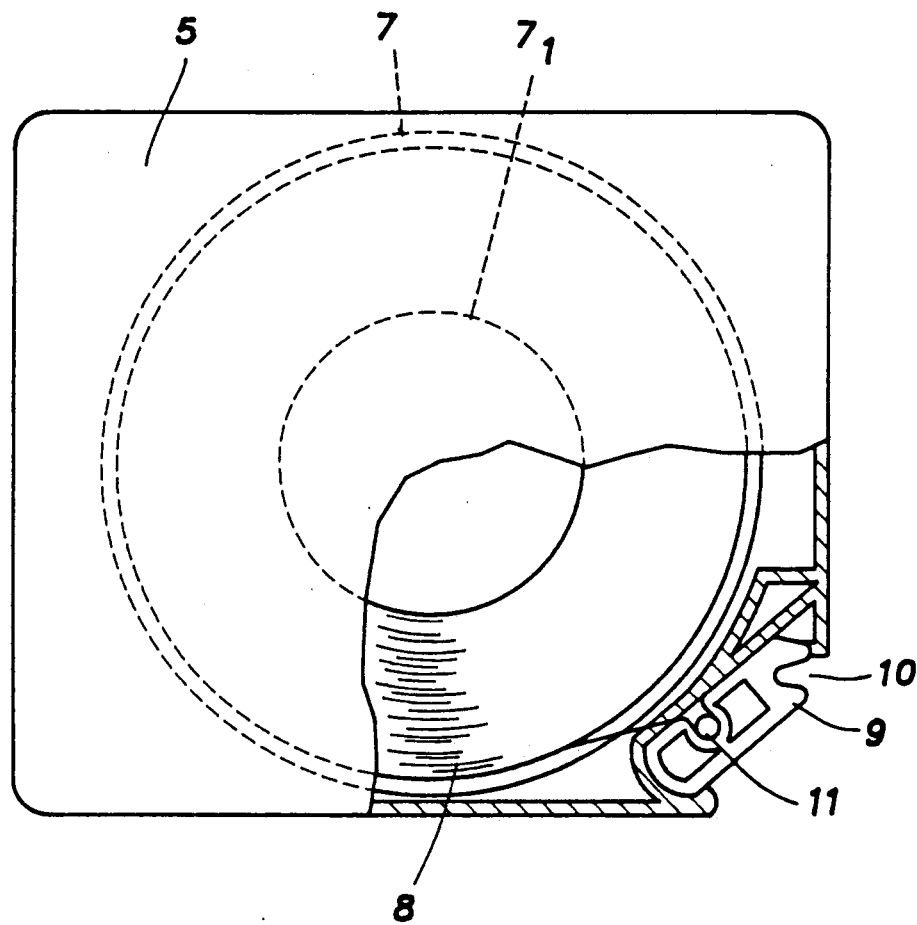
FIG. 4A is a plan view of a tape cartridge used for the invention with a portion broken away.
Figure 4B:
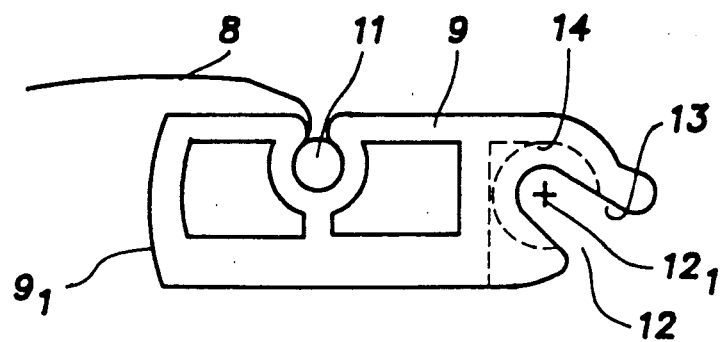
FIG. 4B is an enlarged plan view of the leader block in the tape cartridge of FIG. 4A.

The tape cartridge 5 may be in the form of one which is commoly called "IBM 3480" as described in Japanese Application Laying-Open No. 171,773/1982, for example. The tape cartridge 5 has a single reel 7 contained therein and a leader block 9 provided at the leading end of a magnetic tape 8 wound on the single reel 7 as shown in FIGS. 4A and 4B. The leader block 9 is removably engaged in an opening 10 in the tape cartridge 5 at its corner. The magnetic tape 8 may be connected to the leader block 9 by engaging the leading end of the magnetic tape 8 with the leader block 9 at its side recess by a cylindrical pin 11. A slot 12 formed in the end of the leader block 9 includes a slot portion 13 which is narrower in view of the width of the magnetic tape 8 and a slot portion 14 which is wider in view of the width of the magnetic tape 8, as shown in FIG. 4B. A rear end face $9_1$ of the leader block 9 has a curvature equal to that of a hub $7_1$ of the single reel 7 and a distance between a center $12_1$ of the slot 12 and the rear end face $9_1$ of the leader block 9 is so set to be equal to a radius of the hub $7_1$.

As shown in FIGS. 1 through 3, pins 15 and 15 are provided on the main chassis 1 to control the pivotal movement of the cartridge holder 6. The pins 15 and 15 extend through longitudinal holes 16 and 16 in the other ends of the cartridge holder 6 and stops 17 and 17 provided at the top ends thereof, respectively. Coil springs 18 and 18 on the pins 15 and 15 between the main chassis 1 and the cartridge holder 6 serve to urge the cartridge holder 6 in a direction in which it moves far away from the main chassis 1.

A subsidiary chassis 53 is provided on four connecting pins 52, 52, 52 and 52 extending from the main chassis 1 as shown in FIGS. 2 and 3 by four screws 54 in parallel to the main chassis 1 at a rear side of the apparatus or at the side where the pins 3 and 3 are provided. On the subsidiary chassis 53 is rotatably mounted a spur wheel 20 on an axis 21 and having a gear 19 formed on the periphery thereof. The spur wheel 20 is driven by an electric motor 73 securely mounted on the main chassis 1 and is rotated in both directions by reduction drive means including the electric motor 73, a gear 74 provided on a shaft of the electric motor 73, a first reduction gear 77 mounted by a shaft 75 on the main chassis 1, a second reduction gear 78 and a drive gear 79, both of which are mounted on a rotary shaft 76, which is in turn mounted on the main and subsidiary chassis 1 and 53.

An arm 22 is pivotally mounted by a pivotal pin 23 on the spur wheel 20 at the lower face thereof and has a drawing pin member 25 provided on a lower face of its free end.

A leader block drive mechanism is constructed by the aforementioned reduction drive means, the spur wheel 20, the arm 22 and the drawing pin member 25.

Figure 5A:
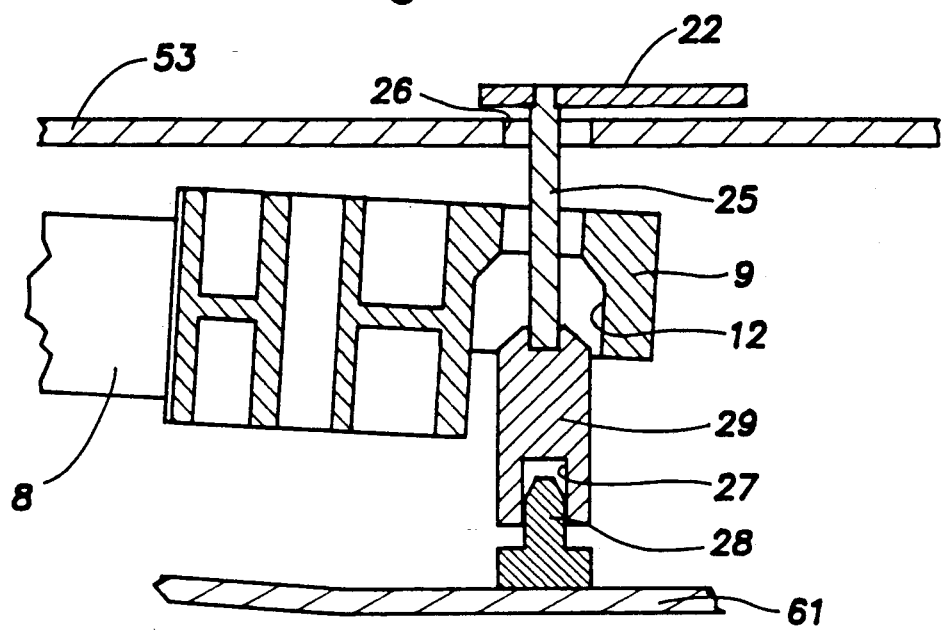
FIG. 5A illustrates in cross section the leader block being disengaged from a drawing pin member.
Figure 5B:
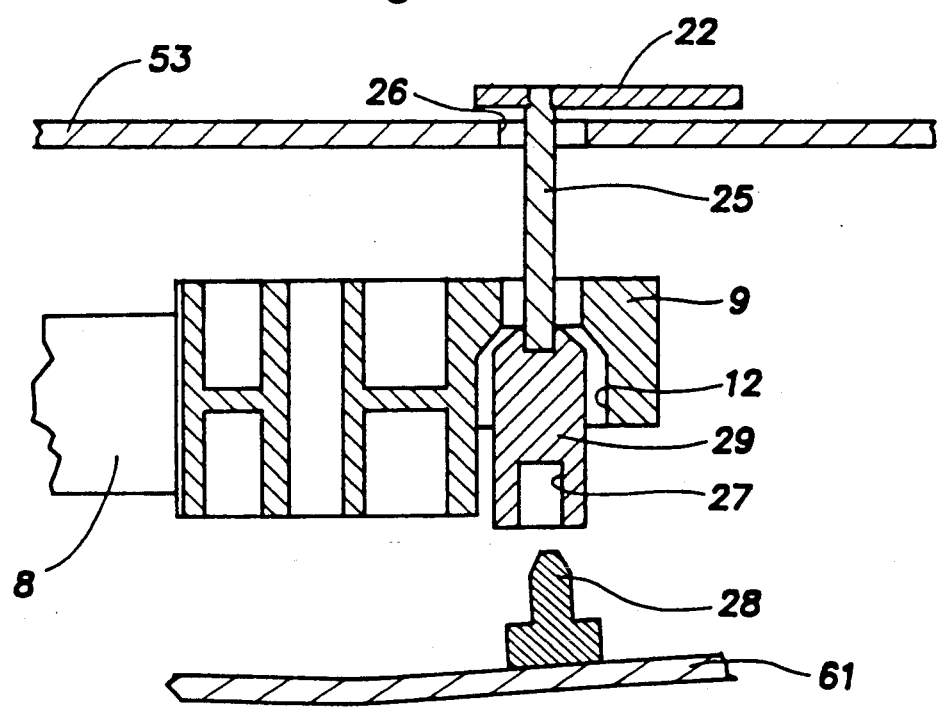
FIG. 5B illustrates in cross section the leader block being engaged with the drawing pin member.

FIGS. 5A and 5B illustrate the drawing pin member 25 being disengaged from and engaged with the leader block 9, respectively.

The drawing pin member 25 at its lower end is provided with a cylindrical engagement portion 29 having a diameter larger than that of the drawing pin member 25. The periphery of the engagement portion 29 at its upper end is so tapered as to correspond to a tapered inner face of the slot 12 in the leader block 9. The engagement portion 29 at its lower end has a cylindrical recess 27 provided therein. A conical engagement pin 28 is upwardly provided on a bottom plate $6_1$ of the cartridge holder 6. As shown in FIG. 5A, when the cartridge holder 6 is brought to a loading/unloading position, the engagement pin 28 is engaged with the cylindrical recess 27 in the engagement portion 29 to lock the leader block drive mechanism from being moved. As shown in FIG. 5B, when the cartridge holder 6 is brought to an operative position, the engagement pin 28 is disengaged from the cylindrical recess 27 in the engagement portion 29. As noted from FIGS. 5A and 5B, the leader block 9 has a height greater than the width of the magnetic tape 8.

Referring again to FIGS. 1 through 3, on the main chassis 1 is pivotally provided by pins 37 and 37 a pair of locking arms 36 and 36 having notches 71 and 71, respectively, to lock the cartridge holder 6 when the tape cartridge 5 is brought to the operative position. Locking pins 40 and 40 are provided on the cartridge holder 6 at its side plates so as to associate with the notches 71 and 71 in the locking arms 36 and 36.

A slidable plate 41 connects the locking arms 36 and 36 at their central portions so as to move them together and is urged by a spring (not shown) in a clockwise direction as viewed in FIG. 2. A solenoid 45 serves to move the slidable plate 41 in a counterclockwise direction, as viewed in FIG. 3, against the spring when electrically excited.

On the main chassis 1 are mounted a drive motor 90 to rotationally drive a winding reel 48 and a drive motor 91 to rotationally drive a reel support 92 engaging the single reel 7 in the tape cartridge 5.

As shown in FIG. 6, a tape running path is determined by tape guides 61 and 62, a magnetic head 63, tape guides 64 and 65 and the winding reel 48 which are disposed with a complicated positional relation to each other so as to compact the apparatus. A leader block guide path for guiding the leader block 9 from the opening 10 in the tape cartridge 5 to a recess 67 in a hub 66 of the winding reel 48 is determined corresponding to the tape running path.

Figure 7:
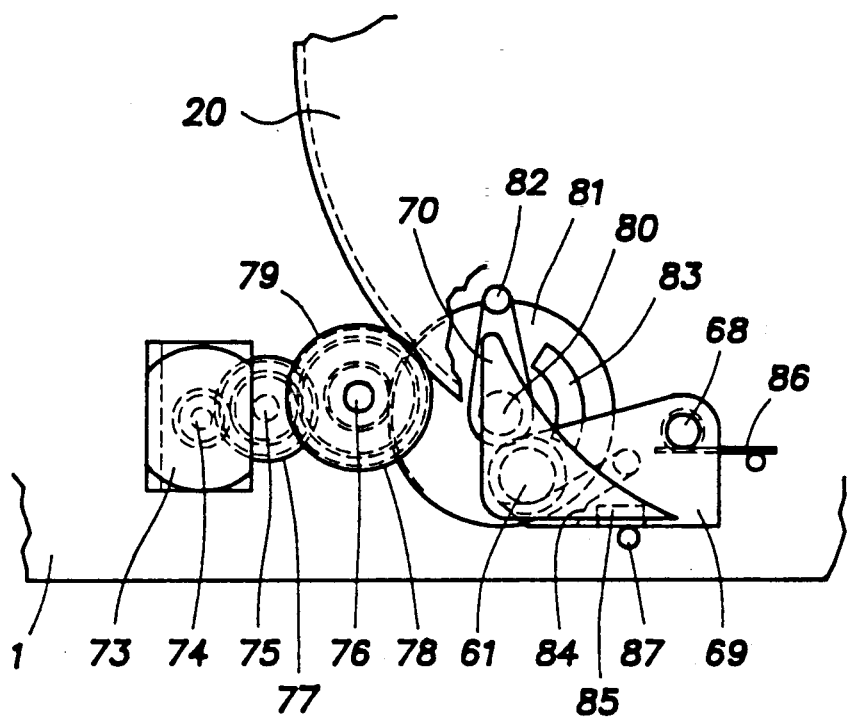
FIG. 7 illustrates in plan view the drive mechanism for driving spur gears and a rotating plate.
Figure 8:
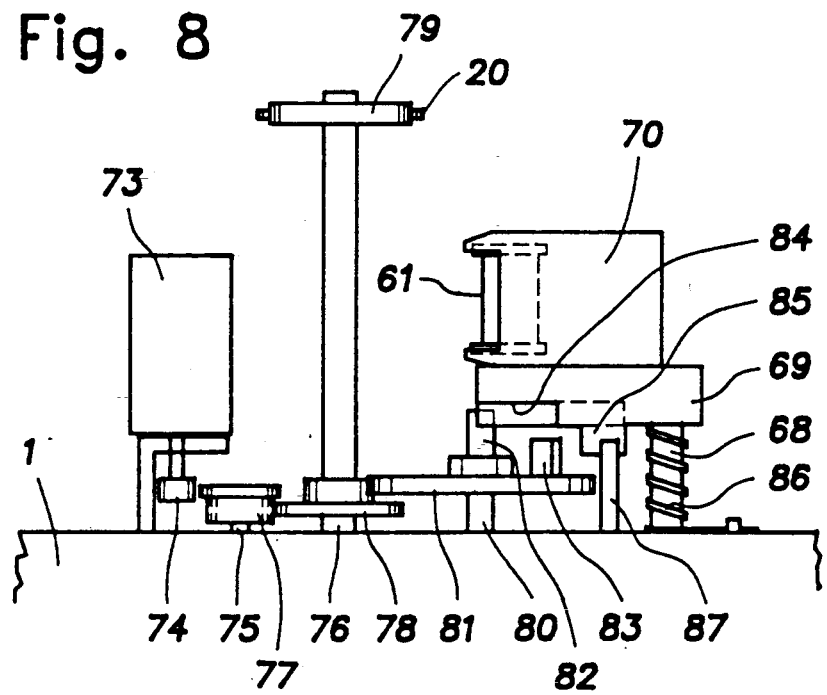
FIG. 8 illustrates in front view the drive mechanism of FIG. 7.

The tape guides 62, 64 and 65 are securely provided on the main chassis 1 while the tape guide 61 is held on a leader block guide 70, which is in turn provided on a swingable plate 69 pivotally supported by a pivotal shaft 68 on the main chassis 1, as shown in FIG. 8. The swingable plate 69 is urged to be swung by a spiral spring 86 in a counterclockwise direction as viewed in FIG. 7. Thus, when the magnetic tape 8 is drawn out of the tape cartridge 5 or when the magnetic tape 8 is contained in the tape cartridge 5, the swingable plate 69 is swung to a dotted line position of FIG. 6 by a drive mechanism, described later, so that the leader block 9 is never disturbed from being moved. The leader block guide 70 serves to guide the leader block 9 at its upper and lower ends without its engagement with the magnetic tape 8 so that the leader block 9 correctly enters the opening 10 in the tape cartridge 5 when the magnetic tape 8 enters the tape cartridge 5.

A C-shaped leader block guide 72 may be provided on the tape guides 64 and 65 at their top and bottom to guide the leader block 9 at its upper and lower ends without its engagement with the magnetic tape 8 so that the leader block 9 never engages the tape guides 64 and 65 when moved.

As shown in FIGS. 7 and 8, the drive mechanism for swinging the swingable plate 69, on which are located the leader block guide 70 and the tape guide 61, includes the electric motor 73 for the spur wheel 20. The second reduction gear 78, which is a part of the reduction drive mechanism for driving the spur wheel 20, is meshed with a gear provided on a periphery of a cam disk 81 which rotates about a shaft 80 on the main chassis 1 to control the swinging movement of the swingable plate 69. A gear ratio of the reduction gear 78, the drive gear 79, the spur wheel 20, and the cam disk 81, is so set that a ratio of rotation of the spur wheel 20 and the cam disk 81 becomes ½.

The cam disk 81 has a pin 82 provided on the upper face thereof and an arcuate raised portion 83 formed in a concentric manner about the shaft 80 on the upper face thereof. In the lower face of the swingable plate 69 is provided a guide groove 84 corresponding to the pin 82 and on the lower face of the swingable plate 69 is provided a protrusion 85 corresponding to the raised portion 83. The guide groove 84 and the protrusion 85 are associated with the pin 82 and the raised portion 83 to swingingly drive the swingable plate 69 against the spiral spring 86. The position of the swingable plate 69 is controlled by engaging the protrusion 85 with the pin 87 on the main chassis 1.

In operation, when the cartridge holder 6 is upwardly swung by the coil springs 18 and 18 to the cartridge loading/unloading position as shown in FIGS. 3 and 5A, the slidable plate 41 is held at its leftward position by the locking arms 36 and 36 and the locking pins 40 and 40 against the spring (not shown).

At such a state, the tape cartridge 5 is inserted into the cartridge holder 6 and the drawing pin member 25 enters the slot 12 in the leader block 9 which is disposed in the opening 10 of the tape cartridge 5. In the cartridge loading/unloading position, when the tape cartridge 5 is inserted into the cartridge holder 6 at the state of the tape cartridge holder 6 being pushed down in FIG. 3, the drawing pin member 25 is never inserted into the slot 12 in the leader block 9 and the slot 12 in the leader block 9 collides with the engagement portion 29 of the drawing pin member 25. However, since the engagement pin 28 on the lower face 6₁ of the cartridge holder 6 is engaged with the recess 27 in the engagement portion 29 so that the position of the drawing pin member 25 is held, the leader block drive mechanism, including the drawing pin member 25, is prevented from being moved even though the tape cartridge 5 is erroneously inserted into the cartridge holder 6. It should be noted that since, at that time, the drawing pin member 25 is held at its upper and lower positions, the drawing pin member 25 is effectively prevented from being deformed due to its collision.

After the tape cartridge 5 is loaded into the cartridge holder 6, the tape cartridge 5 is pushed down aganist the coil springs 18 and 18 and as a result, the locking pins 40 and 40 are positioned at the notches 71 and 71 in the locking arms 36 and 36. Thus, the locking arms 36 and 36 are pivotally moved in a clockwise direction by the springs (not shown) until the tape cartridge 5 is locked at the operative position shown in FIG. 2. At that state, since the drawing pin member 25 is engaged with the leader block 9 as shown in FIG. 5B and since the engagement pin 28 on the cartridge holder 6 at its lower face 6₁ is disengaged from the recess 27 in the engagement portion 29, the drawing pin member 25 is relieved from the state of its position being controlled.

Figure 9:
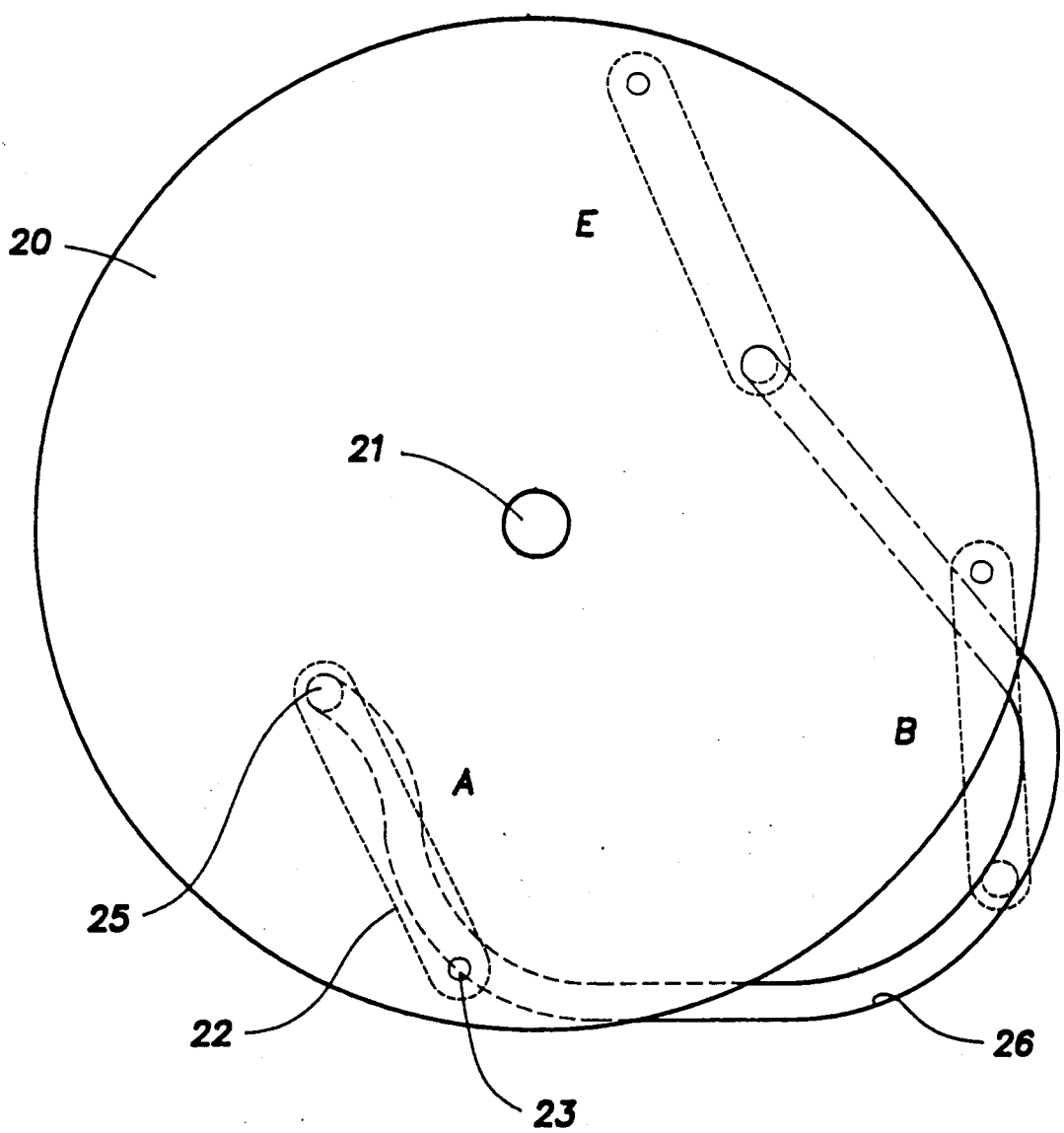
FIG. 9 illustrates in plan view positions where an arm is sequentially located.

A movement of the arm 22 connected to the drawing pin member 25 so that the leader block 9 is moved along the guide path by the drawing pin member 25 is shown in FIG. 9.

As the tape cartridge 5 is detected as being brought to the operative position as shown in FIG. 2, the electric motor 73 rotates in one direction so that the leader block 9 is inserted into the recess 67 in the winding reel 48. This causes the spur wheel 20 to rotate in a counterclockwise direction through the reduction gears 77 and 78 and the drive gear 79 as viewed in FIG. 1. At that time, since the reel support 92 engaging the single reel 7 in the tape cartridge 5 is rotated by the drive motor 91, a back tension is applied to the magnetic tape 8 while the leader block 9 is being drawn out. Also, since the swingable plate 69 reaches the dotted line position of FIG. 6, the tape guide 61 and the leader block guide 70 never disturb the movement of the leader block 9.

Since the drawing pin member 25 is guided along the guide groove 26 accompanying the rotation of the spur wheel 20, the arm 22 is moved from the position A of FIG. 9 through the position B where the spur wheel 20 is rotated by 100 degrees to the position E where the leader block 9 is inserted into the recess 67 in the winding reel 48.

FIGS. 10A through 10E illustrate the sequential movement of the tape guide 61 and the leader block guide 70 driven by the drive source commonly used for the drawing pin member 25. It will be noted that the positions A, B and E of FIGS. 10A, 10B and 10E correspond to the positions A, B and E of FIG. 9, respectively.

The electric motor 73 for moving the leader block 9 also serves to rotate the cam disk 81 so as to swingingly move the swingable plate 69 on which the tape guide 61 and the leader block guide 70 are mounted. A rotation of the electric motor 73 in one direction causes the cam disk 81 to be rotated by 200 degrees in a counterclockwise direction from the position A while the spur wheel 20 is rotated by 100 degrees in a counterclockwise direction as viewed in FIG. 1 to the position B where the pin 82 on the cam disk 81 nearly begins to engage the guide groove 84 on the swingable plate 69 urged by the spiral spring 86 in a counterclockwise direction as viewed in FIG. 10B.

The swingable plate 69 begins to rotate from the position where the cam disk 81 passes the position B. Since the drawing pin member 25 is brought to the position where it already passes the magnetic head 63 as shown in FIG. 9, the movement of the the tape guide 61 and the leader block guide 70 mounted on the swingable plate 69 from the position B never disturbs the leader block 9 from being moved. Further, since the guide groove 84 is formed in the swingable plate 69 in parallel to a direction in which the pin 82 enters the guide groove 84, the swingable plate 69 can begin to rotate in a smooth manner.

As the cam disk 81 further rotates by 270 degrees until it reaches the position C, the pin 82 rotates the swingable plate 69 about the shaft 68 while it is introduced into the guide groove 84 until the pin 82 nearly reaches the bottom of the guide groove 84. As the cam disk 81 further rotates, the swingable plate 69 is rotated in a clockwise direction as viewed in FIG. 10D while the pin 82 is removed out of the guide groove 84 until it reaches the position D. In this position of the cam disk 81, the end of the raised portion 83 on the cam disk 81 nearly contacts with the protrusion 85 on the swingable plate 69.

As the cam disk 81 further rotates, the pin 82 is removed out of the guide groove 84 and the swingable plate 69 is held at the position D against the spiral spring 86 by raised portion 83 formed on the cam disk 81 in a manner concentric relative to the shaft 80. As noted from FIG. 10E, as the cam disk 81 further rotates until it reaches the 360 degree position E, the protrusion 83 on the cam disk 81 continues to engage the raised portion 85 on the swingable plate 69 at its center. Thus, it will be noted that the swingable plate 69 is held at its position although the cam disk 81 is rotated from the postion D to the position E.

The electric motor 73 is stopped by a detector which detects that the arm 22 and the cam disk 81 have reached the position E. At that time, the magnetic tape 8 is positioned at the tape running path as shown in FIG. 6 by 180 degree rotation of the spur wheel 20 and 360 degree rotation of the cam disk 81. In this condition, the winding reel 48 and the single reel 7 in the tape cartrdige 5 are driven by the drive motors 90 and 91, respectively. Thus, it will be noted that the magnetic head 63 can record or reproduce signals on and from the magnetic tape 8.

Figure 10A:
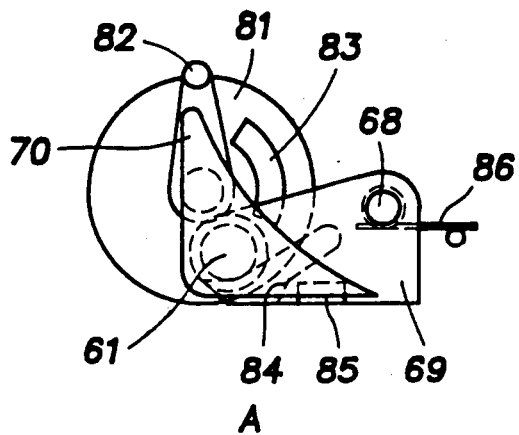
FIGS. 10A through 10E sequentially illustrate positions where a tape guide and a leader block guide are located.
Figure 10B:
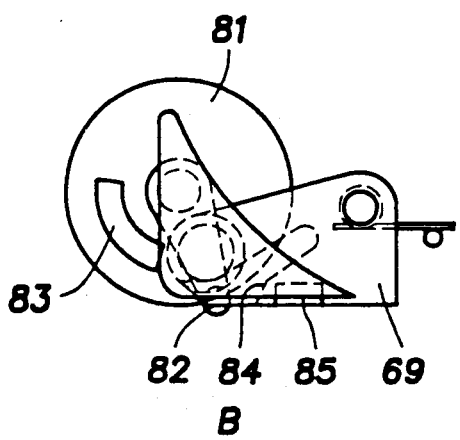
Figure 10C:
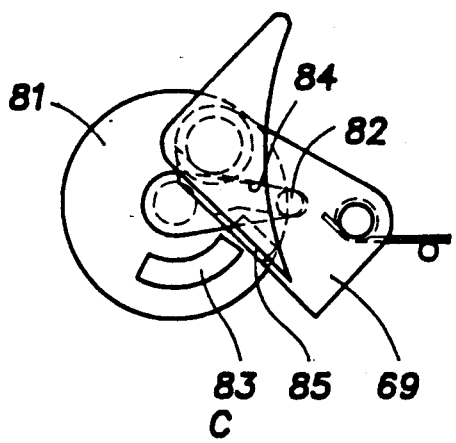
Figure 10D:
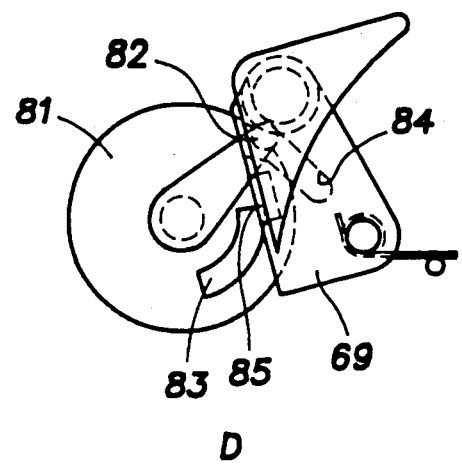
Figure 10E:
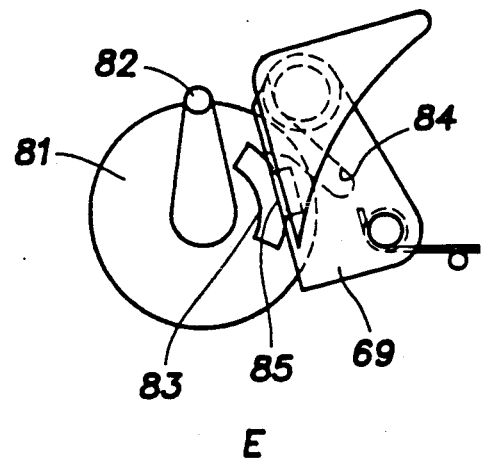

Unloading operation of the tape cartridge 5 out of the apparatus will be described hereinjustbelow. When it is detected that the magnetic tape 8 is wound up on the single reel 7 in the tape cartridge 5 as shown in FIG. 6, an instruction is generated to drive the electric motor 73 in a reverse direction to thereby rotatably drive the spur wheel 20 and the cam disk 81 through the reduction drive mechanism in a clockwise direction. The cam disk 81 is rotated from the position E of FIG. 10E to the position A of FIG. 10A. Thus, the swingable plate 69 is swingingly moved in a counterclockwise direction until it is controlled by the pin 87 as shown in FIG. 10A or FIG. 7. Accordingly, the tape guide 61 and the leader block guide 70 are brought to the dotted line position of FIG. 6.

Similarly, the spur wheel 20 is rotated in a clockwise direction, the arm 22 is moved from the position E to the position A as shown in FIG. 9. Thus, the leader block 9 is returned to the opening 10 in the tape cartridge 5 and then the electric motor 73 is stopped by the detected output from the detector. It should be noted that since the tape guide 61 and the leader block guide 70 are brought by the cam disk 81 to the dotted line position of FIG. 6, the leader block 9 is never disturbed from passing therethrough.

While the leader block 9 is moved inwardly the reel support 92 engaging the single reel 7 in the tape cartridge 5 is driven by the drive motor 91 to wind the magnetic tape 8 so that it is not slackened. Also, the leader block guide 72 serves to guide the leader block 9 at its upper and lower end so that it never contacts with tape guides 64 and 65. Also, the leader block guide 70 serves to guide the leader block 9 so that it positively enters the opening 10 in the tape cartridge 5.

Such an operation of guiding the leader block will be described with reference to FIG. 11.

As the drawing pin member 25 is moved along the guide groove 26 so that the leader block 9 enters the opening 10 in the tape cartrdige 5, the rear end face $9_1$ of the leader block 9 at its edge $9_3$ slidably engages the leader block guide 70 at its upper and lower ends as indicated by the position A of FIG. 11. As the drawing pin member 25 further moves from the position A, the leader block 9 is located at the position B where the side face $9_2$ of the leader block 9 slidably engages the leader block guide 70 while the rear end face $9_1$ of the leader block 9 enters the opening 10 in the tape cartridge 5. As the drawing pin member 25 further moves, the leader block 9 is located at the position C where the side face $9_2$ of the leader block 9 is far away from the leader block guide 70 while the rear end face $9_1$ of the leader block 9 at its edge $9_3$ engages the inner wall $10_1$ of the opening 10 in the tape cartridge 5. The leader block 9 is pivotally moved about its edge $9_3$ from the position C to the position D where it is introduced into the opening 10 in the tape cartridge 5.

Following the introduction of the leader block 9 into the opening 10 in the tape cartridge 5, the solenoid 45 is electrically excited in order to remove the tape cartridge 5 from the apparatus. This causes the slidable plate 41 to be moved in a leftward direction as viewed in FIG. 2 against the spring (not shown) with the result that the locking arms 36 and 36 are pivotally moved in a counterclockwise direction as viewed in FIG. 2 so that the the locking arms 36 and 36 are disengaged from the locking pins 40 and 40 as shown in FIG. 3. Thus, the cartridge holder 6 is pivotally moved about the pins 3 and 3 by the springs 18 and 18 until it reaches the cartridge loading/unloading position which is controlled by the stops 17 and 17 as shown in FIG. 3. It should be noted that the cartridge loading/unloading position of the cartridge holder 6 is held by the locking arms 36 and 36 at their side faces engaging the locking pins 40 and 40 although the solenoid 45 is electrically interrupted.

Figure 12:
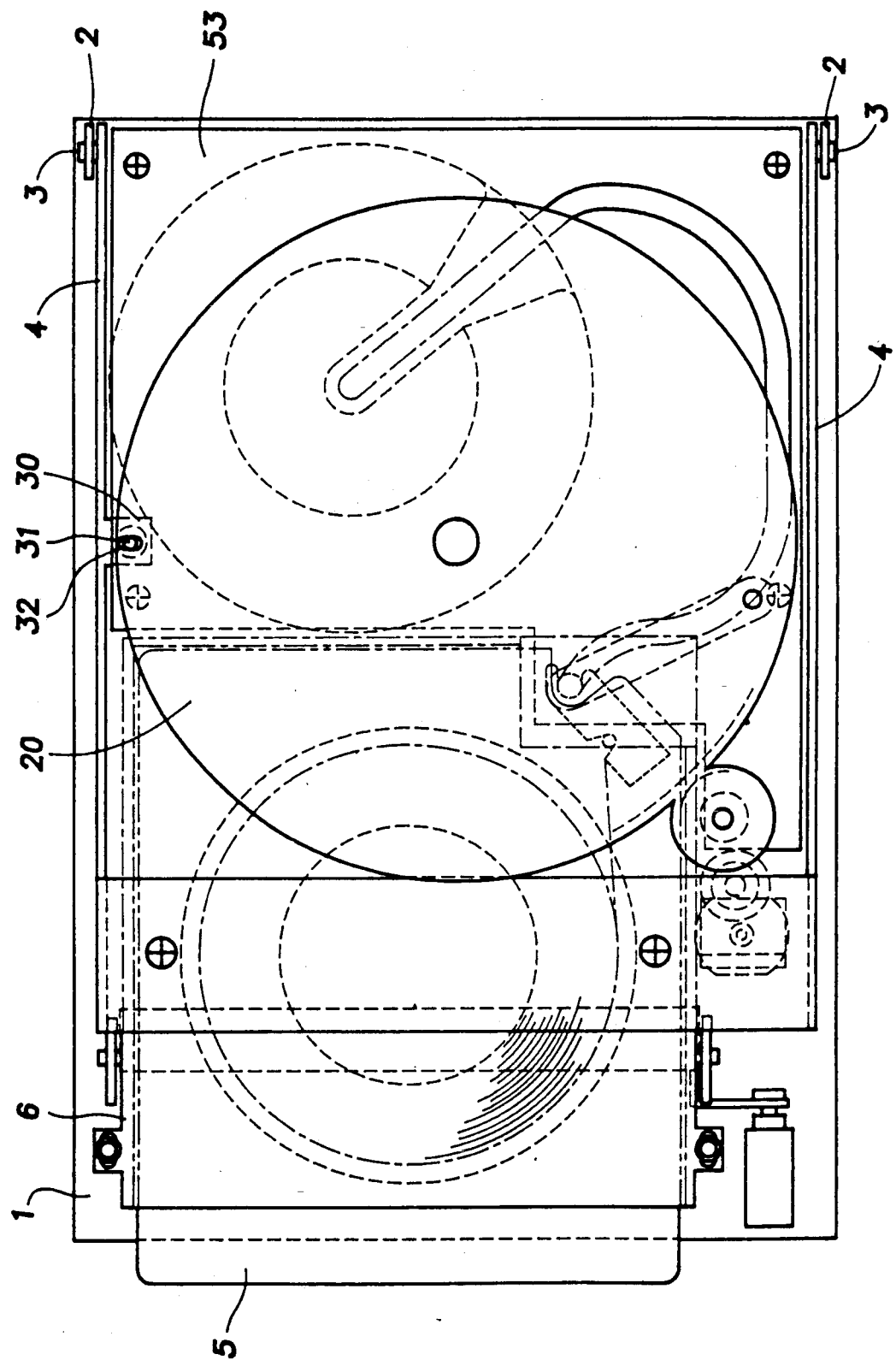
FIG. 12 illustrates in plan view control means to control a movement of the drawing pin member constructed in accordance with another embodiment of the invention at the position where the tape cartridge is brought to the operative position.
Figure 13:
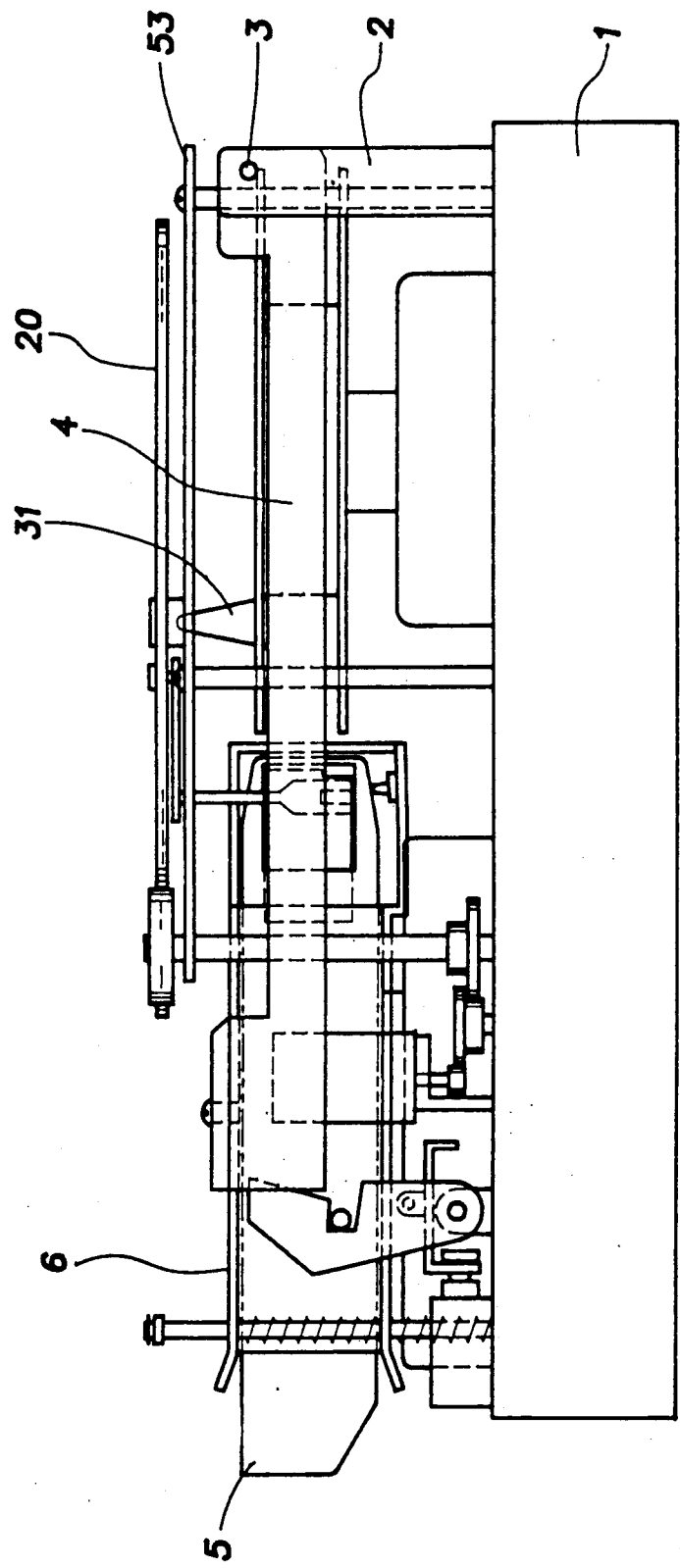
FIG. 13 illustrates in side elevational view the control means of FIG. 12.
Figure 14:
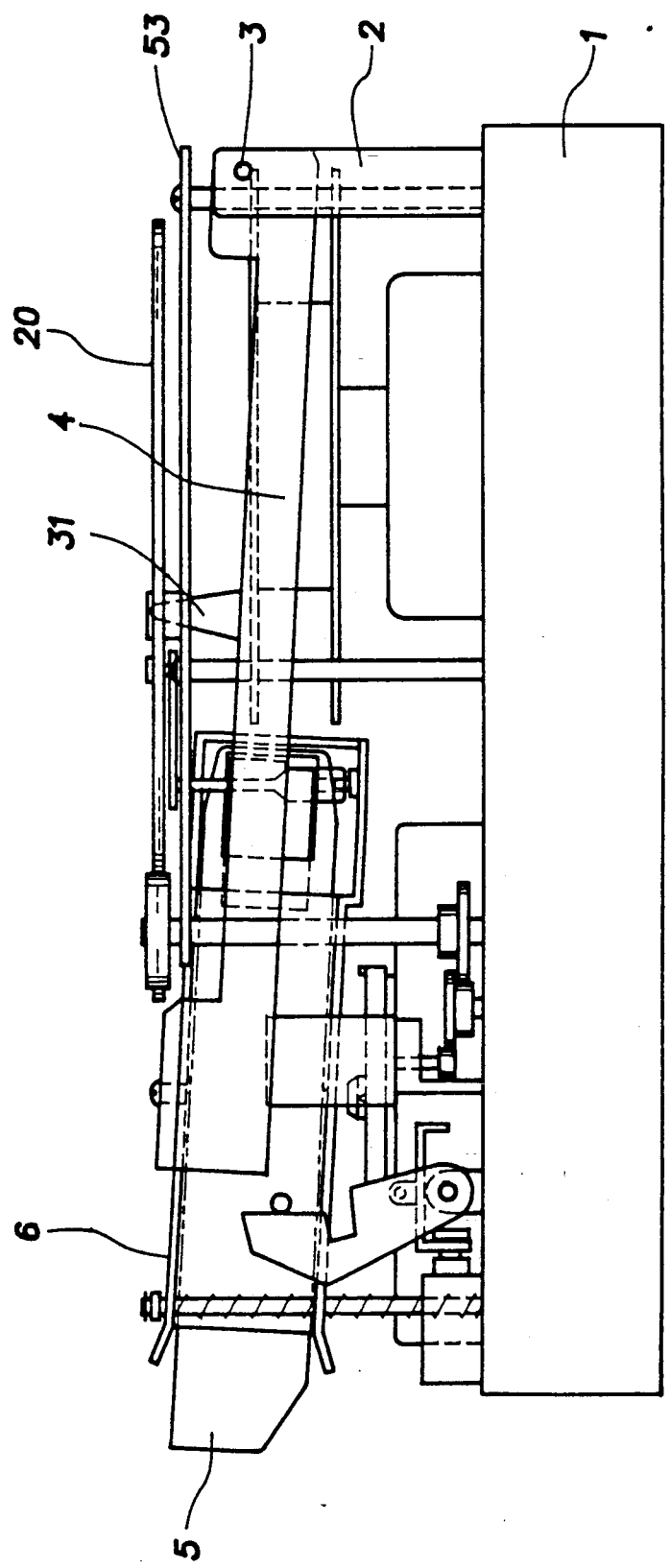
FIG. 14 illustrates in side elevational view the control means identical to that of FIG. 11, but located at the cartridge loading/unloading position.

FIGS. 12 through 14 illustrate another embodiment of the invention in which the leader block drive means is modified. In the embodiment of FIGS. 12 through 14, one of the swingable arms 4 and 4 swingingly supporting the cartridge holder 6 is provided with a bracket 30 on which a conical engagement pin 31 is securely mounted. The conical engagement pin 31 extends through a hole (not shown) in the subsidiary chassis 53.

When the cartridge holder 6 is located at the cartridge loading/unloading position as shown in FIG. 14, the conical engagement pin 31 extends through a longitudinal hole 32 formed in the spur wheel 20 so as to control the rotation of the spur wheel 20 whereby the leader block drive mechanism is locked from being moved.

When the cartridge holder 6 is located at the cartridge operative position as shown in FIG. 13, the swingable arms 4 and 4 are swingingly moved about the pins 3 and 3 so that the conical engagement pin 31 is disengaged from the longitudinal hole 32 in the spur wheel 20 whereby the spur wheel 20 is unlocked so as to be able to be moved.

Although some embodiments of the invention have been described and illustrated with reference to the accompanying drawings, it will be understood by those skilled in the art that they are by way of examples, and that various changes and modifications may be made without departing from the spirit and scope of the invention. There may be proposed such locking members as are associated with the cartridge holder so that the leader block drive mechanism is locked from being moved. Thus, it will be noted that the invention is defined only by the appended claims.

What is claimed is:

1. A magnetic recording and reproducing apparatus comprising a leader block drawing mechanism for drawing a leader block provided at a leading end of a magnetic tape from a tape cartridge having a single reel provided therein and containing said magnetic tape, said leader block drawing mechanism characterized by:
   a cartridge holder to hold said tape cartridge and movable between a cartridge loading/unloading position and an operative position relative to a chassis of said apparatus;
   an engagement portion to engage with said leader block, said engagement portion having first and second ends;
   leader block drive means provided on said chassis to drive said first end of said engagement portion along a predetermined guide path;
   and prevention means provided in said cartridge holder to engage said second end of said engagement portion so as to prevent movement of said leader block drive means at said loading/unloading position of said cartrige holder and to allow movement of said leader block drive means at said operative position of said cartridge holder.

2. A magnetic recording and reproducing apparatus as set forth in claim 1, including a drawing pin member providing said engagement portion engageable with said leader block, and wherein said prevention means is provided on a bottom plate of said cartridge holder to engage with said drawing pin member.

3. A magnetic recording and reproducing apparatus as set forth in claim 1, wherein said prevention means is provided on a bottom plate of said cartridge holder to engage with said engagement portion.

4. A magnetic recording and reproducing apparatus as set forth in claim 3, wherein said prevention means comprises an engagement pin provided on said bottom plate of said cartridge holder so as to engage with a recess provided in said second end of said engagement portion.

5. A magnetic recording and reproducing apparatus comprising a leader block drawing mechanism for drawing a leader block provided at a leading end of a magnetic tape from a tape cartridge having a single reel provided therein and containing said magnetic tape, said leader block drawing mechanism characterized by:
   a cartridge holder to hold said tape cartridge and movable between a cartridge loading/unloading position and an operative position relative to a chassis of said apparatus;
   a pair of swingable arms to support said cartridge holder;
   an engagement portion to engage with said leader block;
   leader block drive means provided on said chassis to drive said engagement portion along a predetermined guide path;
   and prevention means provided on one of said swingable arms to engage with said leader block drive means so as to prevent movement of said leader block drive means at said loading/unloading position of said cartridge holder and to allow movement of said leader block drive means at said operative position of said cartridge holder.

* * * * *